United States Patent
Granger et al.

(10) Patent No.: US 10,285,394 B1
(45) Date of Patent: May 14, 2019

(54) FLOATING PIER, PINNIPED DETERRENT SYSTEM

(71) Applicant: The United States of America as represented by the Secretary of the Navy, Washington, DC (US)

(72) Inventors: Brian J Granger, San Diego, CA (US); William A Chambers, Jamul, CA (US); Kelly G Krueger, La Mesa, CA (US); John E Hoopes, San Diego, CA (US)

(73) Assignee: United States of America as represented by Secretary of the Navy, Washington, DC (US)

( * ) Notice: Subject to any disclaimer, the term of this patent is extended or adjusted under 35 U.S.C. 154(b) by 786 days.

(21) Appl. No.: 14/919,499

(22) Filed: Oct. 21, 2015

(51) Int. Cl.
*A01M 29/24* (2011.01)
*A01M 29/10* (2011.01)
*E04B 1/72* (2006.01)
*E04B 1/68* (2006.01)

(52) U.S. Cl.
CPC ............ *A01M 29/24* (2013.01); *A01M 29/10* (2013.01); *E04B 1/6803* (2013.01); *E04B 1/72* (2013.01)

(58) Field of Classification Search
CPC .............................. A01M 29/10; A01M 29/24
USPC ......................................................... 119/200
See application file for complete search history.

(56) References Cited

U.S. PATENT DOCUMENTS

| | | | |
|---|---|---|---|
| 5,331,602 A | | 7/1994 | McClaren |
| 5,850,808 A * | 12/1998 | Burdick | ................ A01M 29/26 119/713 |
| 6,006,698 A * | 12/1999 | Negre | ................... A01M 29/26 119/537 |
| 6,933,446 B1 * | 8/2005 | Waldorf | ................ A01M 29/26 174/117 F |
| 7,351,913 B2 * | 4/2008 | Waldorf | ................ A01M 29/26 174/117 F |
| 8,293,044 B1 * | 10/2012 | Riddell | ................. A01M 29/26 156/71 |
| 8,430,063 B1 * | 4/2013 | Riddell | ................. A01M 29/26 119/712 |
| 8,434,209 B1 * | 5/2013 | Riddell | ................. A01M 29/26 29/525.01 |
| 8,733,014 B2 * | 5/2014 | Donoho | ............... A01M 29/24 340/573.2 |
| 8,887,437 B2 * | 11/2014 | Donoho | ............... A01M 29/26 340/573.2 |

(Continued)

FOREIGN PATENT DOCUMENTS

CA 2882994 A1 * 8/2016 ............. F21V 31/03

*Primary Examiner* — Monica L Williams
*Assistant Examiner* — Aaron M Rodziwicz
(74) *Attorney, Agent, or Firm* — SPAWAR Systems Center Pacific; Kyle Eppele; Susanna J. Torke

(57) ABSTRACT

A system for deterring pinnipeds comprising a plurality of connected tracks interspersed with expansion joints, wherein the tracks and expansion joints are operatively coupled via connector keys that fit into a recessed channel running underneath the tracks and expansion joints, the tracks and expansion joints having electrically insulated recessed channels allowing for conductive wire to run throughout the tracks and expansion joints, the expansion joints further comprising two wells allowing for excess wire to be coiled and housed, acting as a spring and allowing for expansion, and the wire is connected to a power source.

20 Claims, 12 Drawing Sheets

(56) References Cited

U.S. PATENT DOCUMENTS

| | | | | |
|---|---|---|---|---|
| 9,192,153 B2* | 11/2015 | Riddell | ............... | A01M 29/26 |
| 9,585,377 B1* | 3/2017 | Alshaheen | ............... | H05C 1/04 |
| 9,717,230 B2* | 8/2017 | Donoho | ............... | A01M 29/26 |
| 2004/0200439 A1* | 10/2004 | Thomas | ............... | A01M 29/24 |
| | | | | 43/98 |
| 2005/0132635 A1* | 6/2005 | Riddell | ............... | A01M 29/26 |
| | | | | 43/98 |
| 2006/0032111 A1* | 2/2006 | Willard | ............... | A01M 29/26 |
| | | | | 43/98 |
| 2007/0214710 A1* | 9/2007 | Donoho | ............... | A01M 29/26 |
| | | | | 43/98 |
| 2008/0028668 A1* | 2/2008 | Pollman | ............... | A01M 1/223 |
| | | | | 43/112 |
| 2010/0180490 A1* | 7/2010 | Donoho | ............... | A01M 29/24 |
| | | | | 43/98 |
| 2011/0023792 A1* | 2/2011 | Osypka | ............... | A01M 29/24 |
| | | | | 119/721 |
| 2011/0146589 A1* | 6/2011 | Donoho | ............... | A01M 29/26 |
| | | | | 119/713 |
| 2011/0214339 A1* | 9/2011 | Donoho | ............... | A01M 23/38 |
| | | | | 43/112 |
| 2013/0026432 A1* | 1/2013 | Horvat | ............... | A01M 29/24 |
| | | | | 256/10 |
| 2014/0317993 A1* | 10/2014 | Riddell | ............... | A01M 29/24 |
| | | | | 43/98 |
| 2015/0224999 A1* | 8/2015 | Duprat | ............... | B61B 9/00 |
| | | | | 238/14.3 |
| 2015/0316238 A1* | 11/2015 | Guilmette | ............... | H01R 25/14 |
| | | | | 362/218 |
| 2015/0335007 A1* | 11/2015 | Donoho | ............... | A01M 29/26 |
| | | | | 52/101 |
| 2016/0262373 A1* | 9/2016 | Kumar | ............... | A01M 29/24 |

* cited by examiner

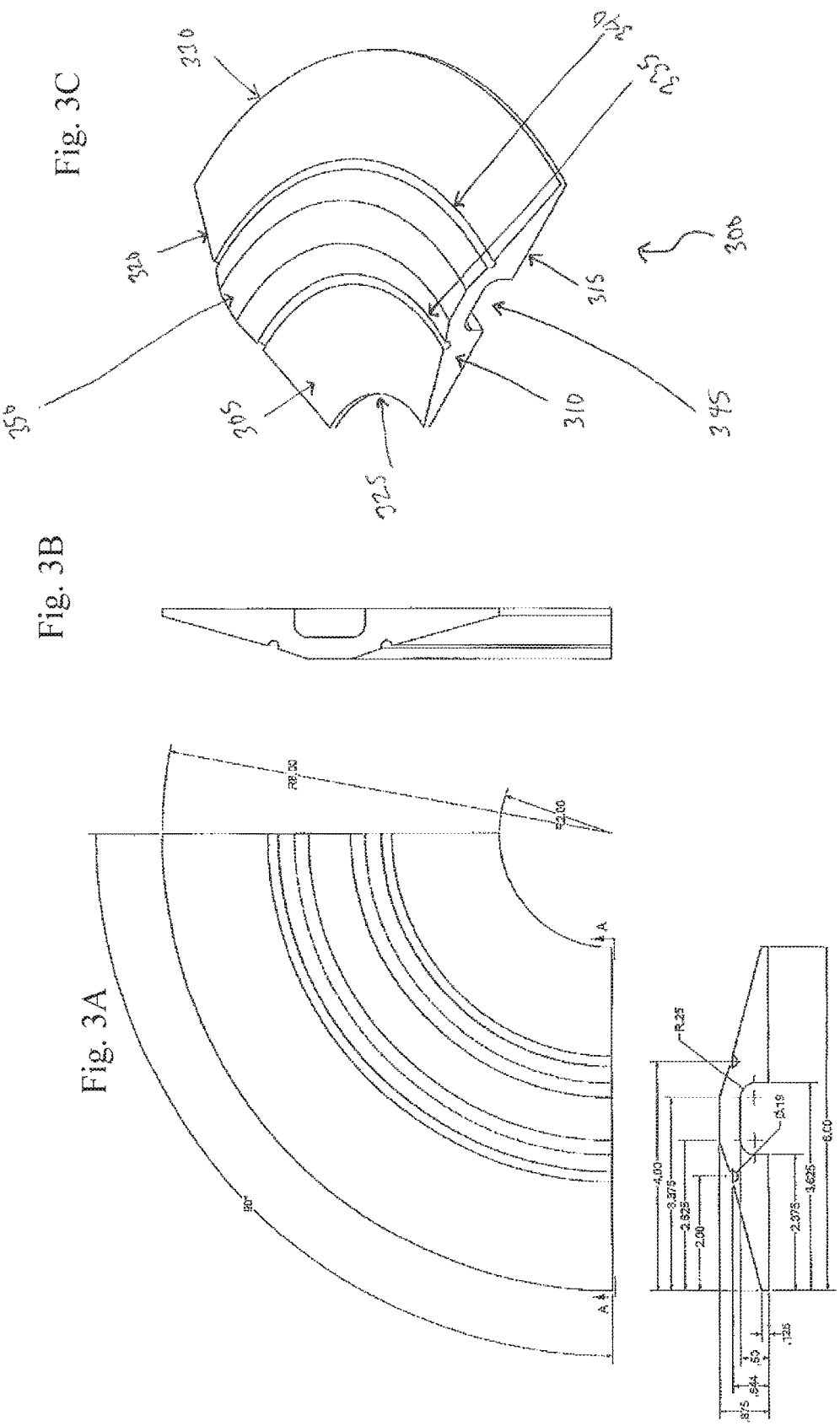

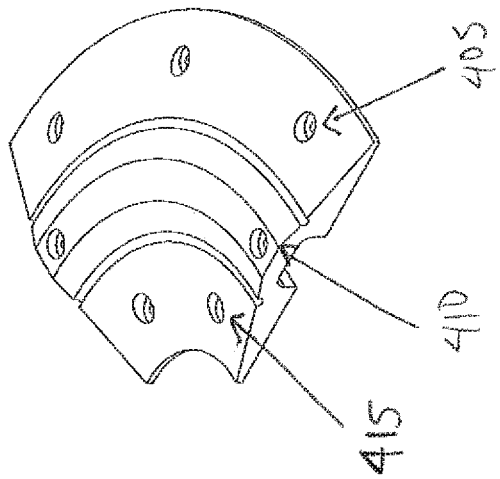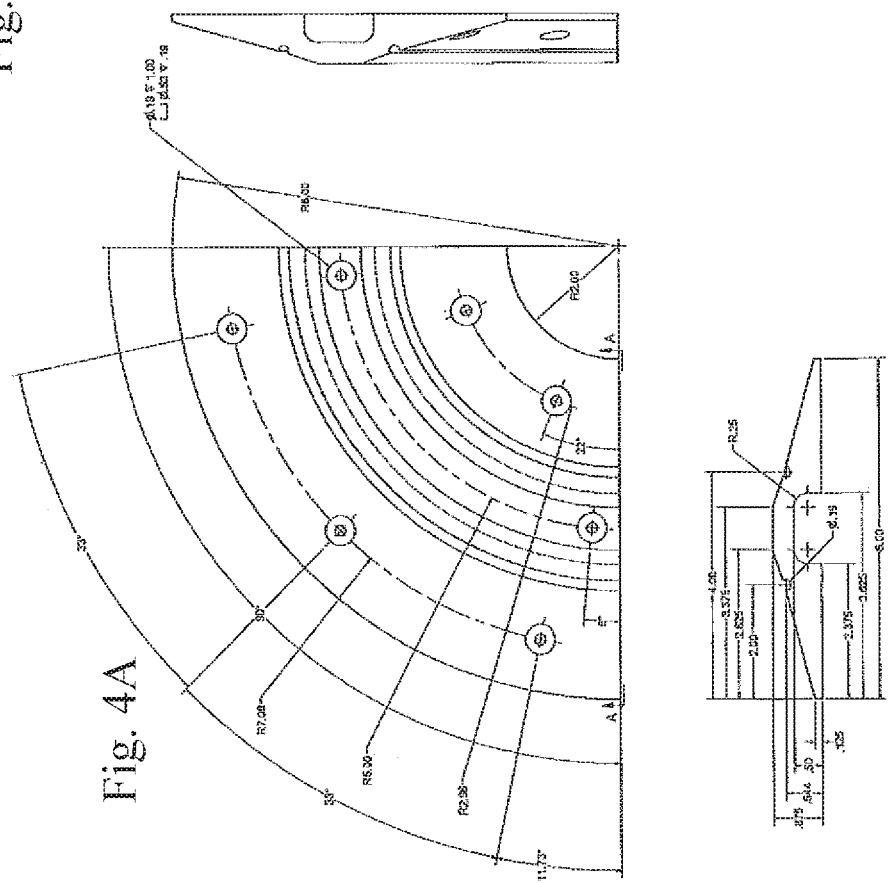
Figs. 4A - 4C

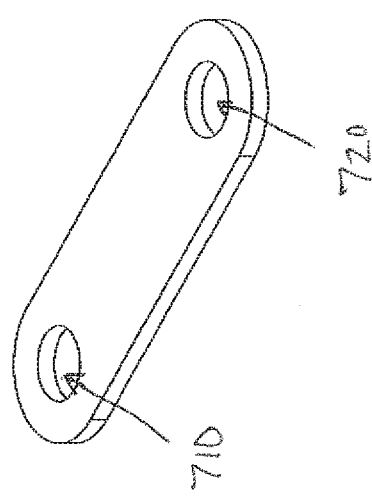
Fig. 7B
Fig. 7D
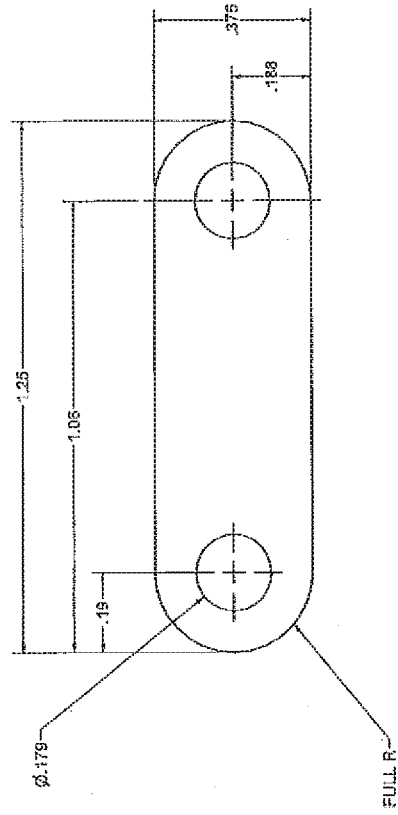
Fig. 7A
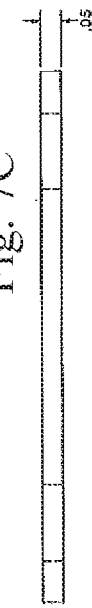
Fig. 7C
Figs. 7A - 7D

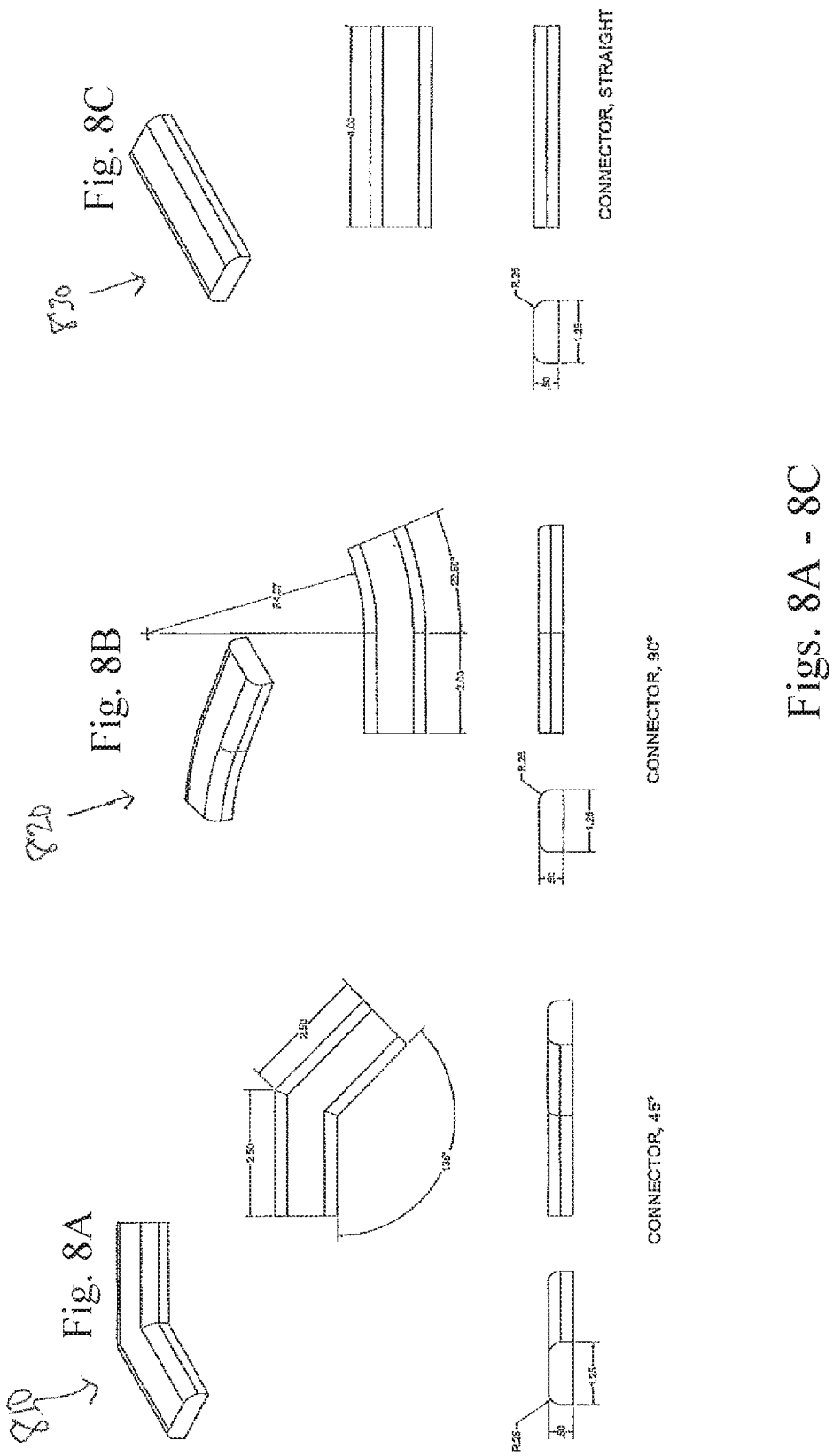

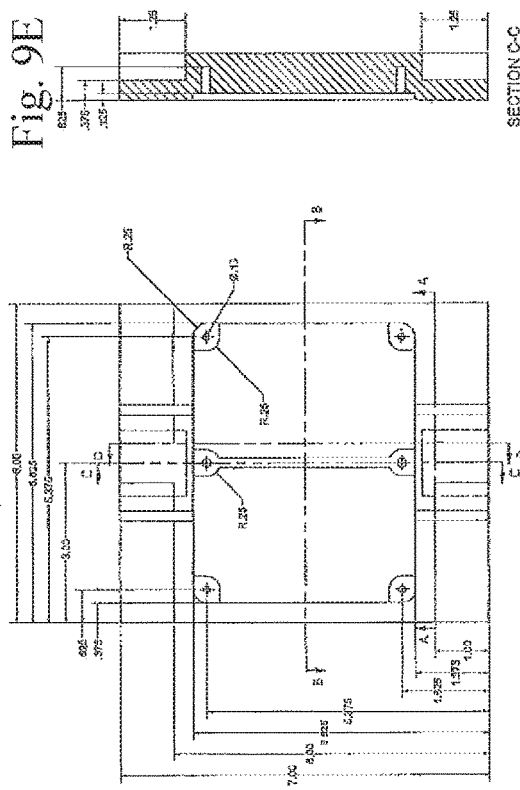
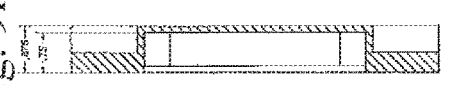
Figs. 9A - 9F

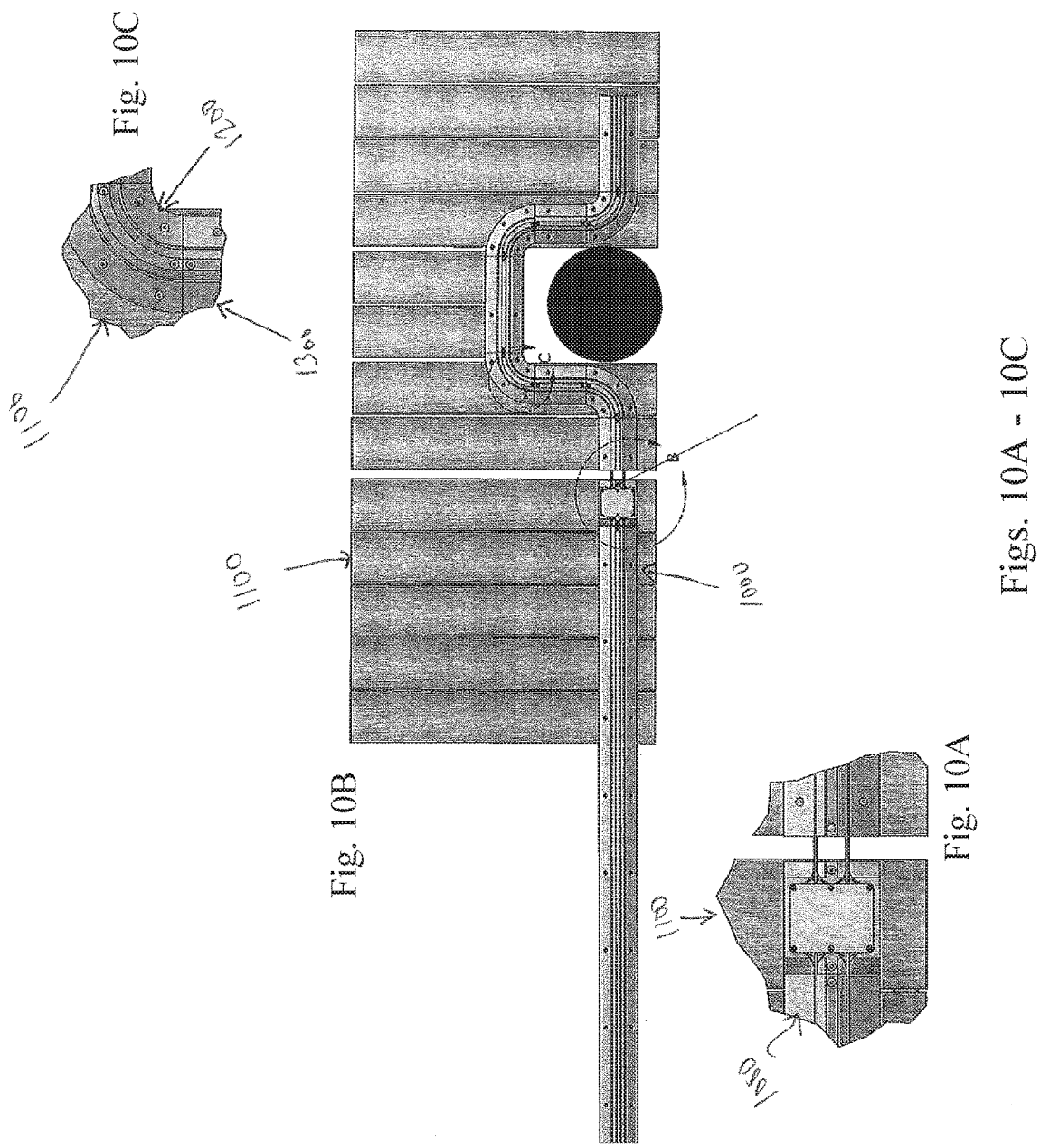

FLOATING PIER, PINNIPED DETERRENT SYSTEM

FEDERALLY-SPONSORED RESEARCH AND DEVELOPMENT

The Floating Pier, Pinniped Deterrent System is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil. Reference Navy Case Number 103568.

BACKGROUND

Pinniped's undeterred access to piers at SPAWAR Systems Center Pacific (SSC-PAC) has resulted in significant and costly damage to federal government property, specifically piers and boats. Additionally, the pinnipeds pose a significant health hazard to humans who are directed to work at these facilities in direct proximity to the pinnipeds. The hazard manifests in two ways. First, the territorial nature of the male California sea lion leads to direct confrontation with humans attempting to access piers and boats resulting in an actual physical hazard and an unsafe work environment. Second, pinnipeds deposit a large volume of excrement that coats the piers and boats each day and poses a sanitary health concern for humans.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3A is a top view of an embodiment of a corner track in accordance with the pinniped deterrent system.

FIG. 3B is a cross section of an embodiment of a corner track in accordance with the pinniped deterrent system.

FIG. 3C is a side view of an embodiment of a corner track in accordance with the pinniped deterrent system.

FIG. 4A is a top view of an embodiment of a corner track with mounting mechanisms in accordance with the pinniped deterrent system.

FIG. 4B is a cross section of an embodiment of a corner track with mounting mechanisms in accordance with the pinniped deterrent system.

FIG. 4C is a side view of an embodiment of a corner track with mounting mechanisms in accordance with the pinniped deterrent system.

FIGS. 7A-7D show a top view (7A), side view (7B), and cross-section views (7C and 7D) of the tab that is mounted on top of the track system and expansion joint in accordance with the pinniped deterrent system.

FIGS. 8A-8C show different embodiments of the connector keys in accordance with the pinniped deterrent system, 8A is a 45-degree connector, 8B is a 90-degree connector, and 8C is a straight connector.

FIG. 9A shows a top view of an embodiment of an expansion joint.

FIGS. 9B-9F show alternate cross-section views of FIG. 9A.

FIG. 10A is a top view of a pinniped deterrent system mounted to a pier in which a pier junction has expanded and the conductive wire has expanded along with it in accordance with the pinniped deterrent system.

FIG. 10B is an extended view of 10A showing a top view of a pinniped deterrent system mounted to a pier in which the pier has expanded.

FIG. 10C is a top view of a corner track coupled with a straight track and mounted to a pier in accordance with the pinniped deterrent system.

DETAILED DESCRIPTION OF SOME EMBODIMENTS

Figure 1:
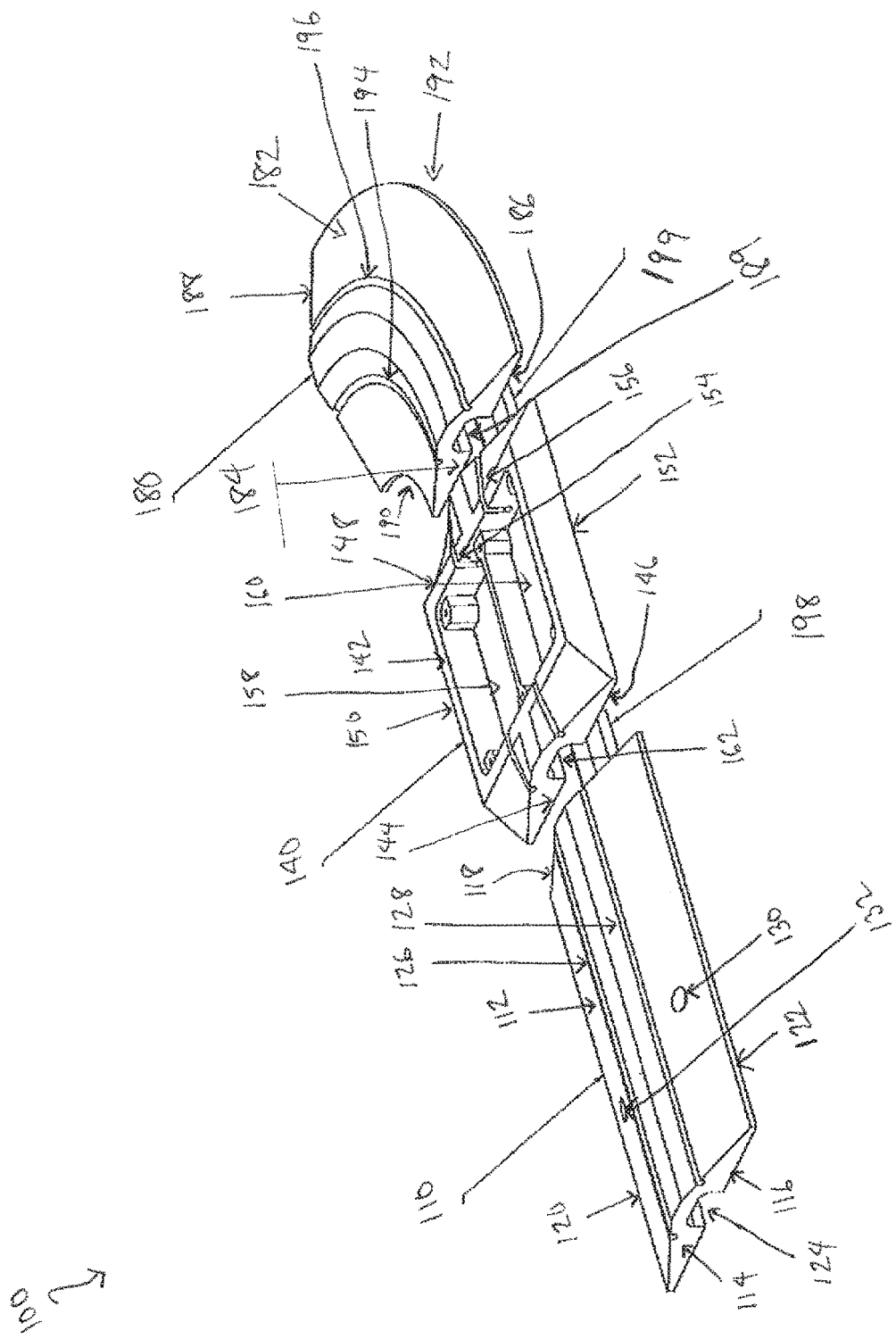
FIG. 1 is an embodiment of the pinniped deterrent system.

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

The proposed pinniped deterrent system utilizes a small electrical potential to instigate an uncomfortable sensation when the animals contact the system which is installed along the accessible perimeter of the pier. Through negative reinforcement, the behavior of the pinniped is altered. By choosing to avoid contact with the system, the animal is effectively deterred from accessing the pier.

The deterrent system consists of two small-gauge, highly-flexible, stainless steel conductive wires attached to a power source. The wires are integrated onto a base track which runs the full perimeter of the pier at all available access points for pinnipeds. Power is applied at power source energizer and energizer controller at the head of the pier enabling remote monitoring and control. When the pinniped attempts to access the pier, it first makes contact with the deterrent system which provides an uncomfortable sensation, subsequently deterring the animal from remaining on the pier. The sensation felt does not harm the animal, but presents an unattractive option for the animal and thus, deters its behavior. Humans may also contact the system without harm.

The deterrent system is essentially a track system that can be mounted to the end of a pier or similar structure that juts out into the water. There is a base track composed of four components: 1) straight track, 2) corner track, 3) expansion joints, and 4) connector "keys." Each of the first three components is aligned and integrated using component 4. The number of straight tracks, corner tracks, and expansion joints required will vary depending on the length of the pier and the number of corners on the pier, however these pieces are interchangeable. The connector keys slide into a recessed channel that runs on the bottom surface of the tracks and expansion joints. Although the system itself is also mounted to the pier or similar structure with nails, screws, or an alternate mechanism, the connector keys add to the stability of the tracks and expansion joints as they are connected together. The connector keys can be straight or curved at various angles depending on which pieces they are connecting and the angle size of the corner.

Figure 12:
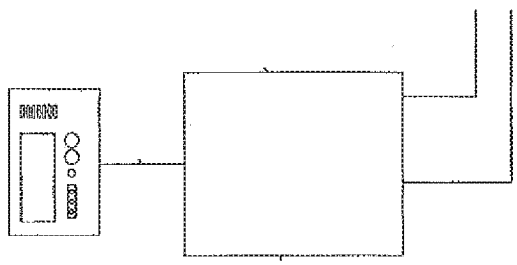
FIG. 12 shows a schematic of the conductive wires connected to a power system in accordance with the pinniped deterrent system.

The Electrical System is depicted in FIG. 12. The "energizer" and "energizer controller" will be a commercially available product such as the Gallagher, Fence Energizer, M 1 800i. The electrical system will include a remote control and a remote monitoring system. A light will illuminate near the energizer controller (clearly visible by pier inhabitants) when the system is energized. The use of electrical potential has proven humane and effective for deterring sea lions. The most rudimentary systems are readily made from basic hardware and an electrical source. A few versions of these rudimentary systems are currently employed at SSC-PAC, however, the systems are not survivable, require significant upkeep and maintenance, and present additional hazards to personnel.

The unique and critical component of this system is the base track which, as described above, is composed of: 1) straight track, 2) corner track, 3) expansion joints, and 4) connector "keys." The wire conductors are mounted on the base track in two electrically insulated channels on top of the tracks. This mounting system offers several critical design features. It provides a rugged, robust, electrically insulating mounting platform to present and protect the deterrent wires. It securely holds each wire in a fixed channel providing uniform separation of several inches. This separation eliminates the potential for electrical shock, while presenting the wires in such a way to maximize opportunity for a sea lion/pinniped to contact both wires when attempting to access the pier. In addition to the insulated channels holding the wires in place, tabs are also intermittently placed on top of the wires and fastened to the top of the tracks, allowing for the wires to come into contact with the pinnipeds without coming loose of the channels.

The channels contain the wires such that they do not present a tripping hazard to personnel or an entanglement hazard for equipment. The tracks are slightly elevated off of the pier, and this elevation keeps the wires off of the deck and provides a water drainage mechanism that prevents the wires from being electrically shorted due to the inevitable presence of sea-water on the deck, or even rain water. The deterrent system is brightly colored and highly visible to readily mark the perimeter of the pier and the presence of the system during daylight hours and contains a channel for integration of an optional lighting system to ensure visibility of the pier perimeter and the deterrent system even at night.

The base track expansion joints provide the electrical wire conductors a means to contract and expand as necessary at pier section junctions. The expansion joints house the wire in a spring-like position allowing for necessary movement, but also protecting it from environmental elements and other external hazards.

An alternate embodiment is to use this system on an autonomous and untethered unmanned surface vehicle. The system could be integrated fully into the pier instead of being installed as an add-on feature. The system may include an LED lighting strip installed in a groove positioned in the top dead center of the track.

FIG. 1 shows the various components that make up pinniped deterrent system 100, however the amount and spacing of each part will depend on the size of the pier or structure to which system 100 is mounted. Thus, system 100 is flexible as needed. For the straight parts of the pier or structure, system 100 comprises a straight track 110, and for the corners of the pier or structure, system 100 comprises a corner track 180. Straight track 110 and corner track 180 can be connected to each other or to expansion joint 140 using either straight connector key 198 or curved connector key 199. Straight track 110 has a top surface 112, a bottom surface 114, a first end 116, a second end 118, a first side 120, and a second side 122. Straight track 110 has a recessed channel 124 on the bottom surface 114 that runs from first end 116 to second end 118. Straight track 110 also has two electrically insulated channels 126 and 128 on top surface 112 that from first end 116 to second end 118. Straight track 110 is slightly inclined from first side 120 to the center of top surface 112, and from second side 122 to the center of top surface 112. Straight track 110 also has mounting capability 130 and 132 allowing it to be attached to a pier or structure with a nail, screw, or an alternate method.

System 100 comprises an expansion joint 140. Expansion joint 140 has a top surface 142, a bottom surface 144, a first end 146, a second end 148, a first side 150 and a second side 152. Expansion joint 140 has a recessed channel 162 on bottom surface 144 that runs from first end 146 to second end 148. Expansion joint 140 has two electrically insulated channels 154 and 156 on top surface 142 that run from first end 146 to second end 148. The channels 154 and 156 also run through two wells 158 and 160 that sit on top surface 142.

System 100 comprises a corner track 180. Corner track 180 has a top surface 182, a bottom surface 184, a first end 186, a second end 188, a first side 190, and a second side 192. Corner track 180 has a recessed channel 189 on bottom surface 184 that runs from first end 186 to second end 188. Corner track 180 has two electrically insulated channels 194 and 196 on top surface 182 that run from first end 186 to second end 188. Corner track 180 is slightly inclined from first side 190 to the center of top surface 182, and from second side 192 to the center of top surface 182.

Figure 2:
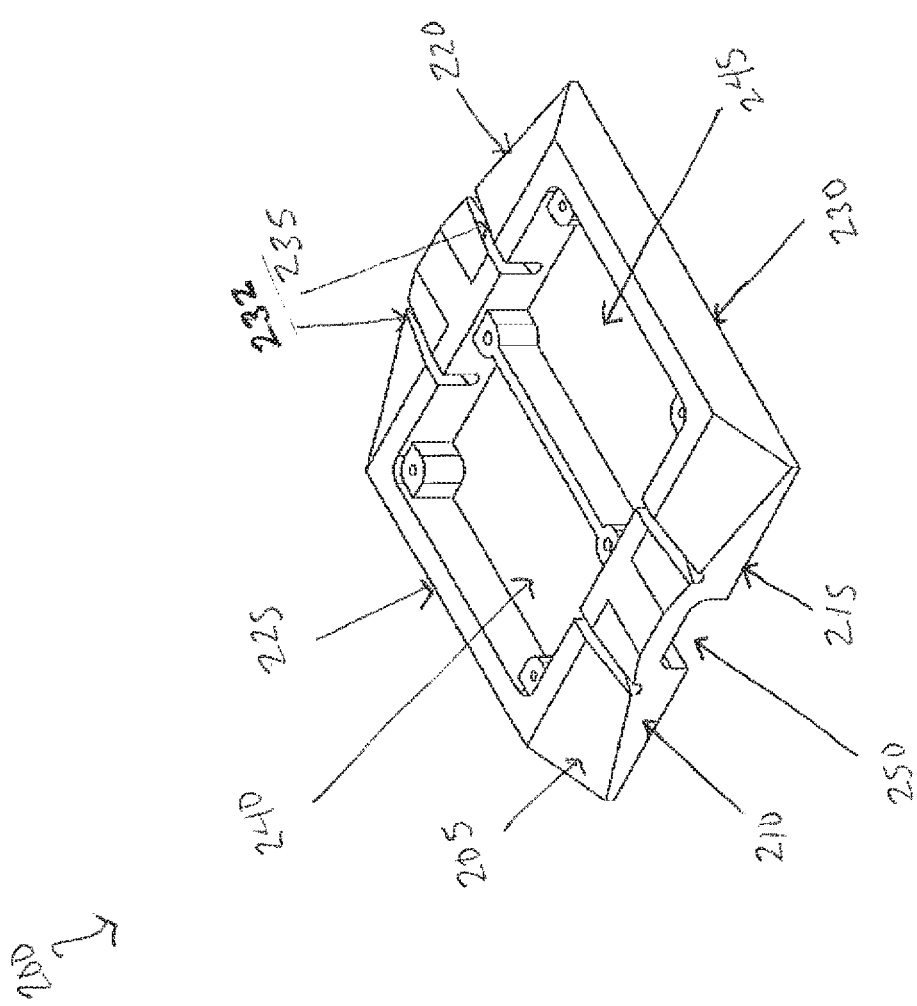
FIG. 2 is a top view of an embodiment of an expansion joint.

FIG. 2 shows expansion joint 200. Expansion joint 200 has a top surface 205, a bottom surface 210, a first end 215, a second end 220, a first side 225, and a second side 230. Expansion joint 200 has two electrically insulated channels 232 and 235 on top surface 205 that run from first end 215 to second end 220. Expansion joint 200 has two wells 240 and 245 on top surface 205. Channels 232 and 235 run through both wells 240 and 245. Expansion joint 200 also has a recessed channel 250 on bottom surface 210 that runs from first end 215 to second end 220.

FIG. 3A is a schematic diagram of a corner track. FIG. 3B is a cross section of a corner track. FIG. 3C shows corner track 300. Corner track 300 has a top surface 305, a bottom surface 310, a first end 315, a second end 320, a first side 325, and a second side 330. Corner track 300 has two electrically insulated channels 335 and 340 on top surface 305 that run from first end 315 to second end 320. Corner track 300 has a recessed channel 345 on bottom surface 310 that runs from first end 315 to second end 320. Corner track 300 is slightly inclined from first side 325 to the center of top surface 305, and from second side 330 to the center of top surface 305. This embodiment of corner track 300 has a third channel 350 in the center of top surface 305 that can be used for LED lighting.

FIG. 4A is another embodiment of a schematic diagram of a corner track. FIG. 4B is an alternate embodiment of a cross section of a corner track. FIG. 4C shows an alternate embodiment of corner track 400 with holes 405, 410, and 415 that can be used to house a nail or screw or similar fastener to mount corner track 400 to a pier or alternate structure.

Figure 5:
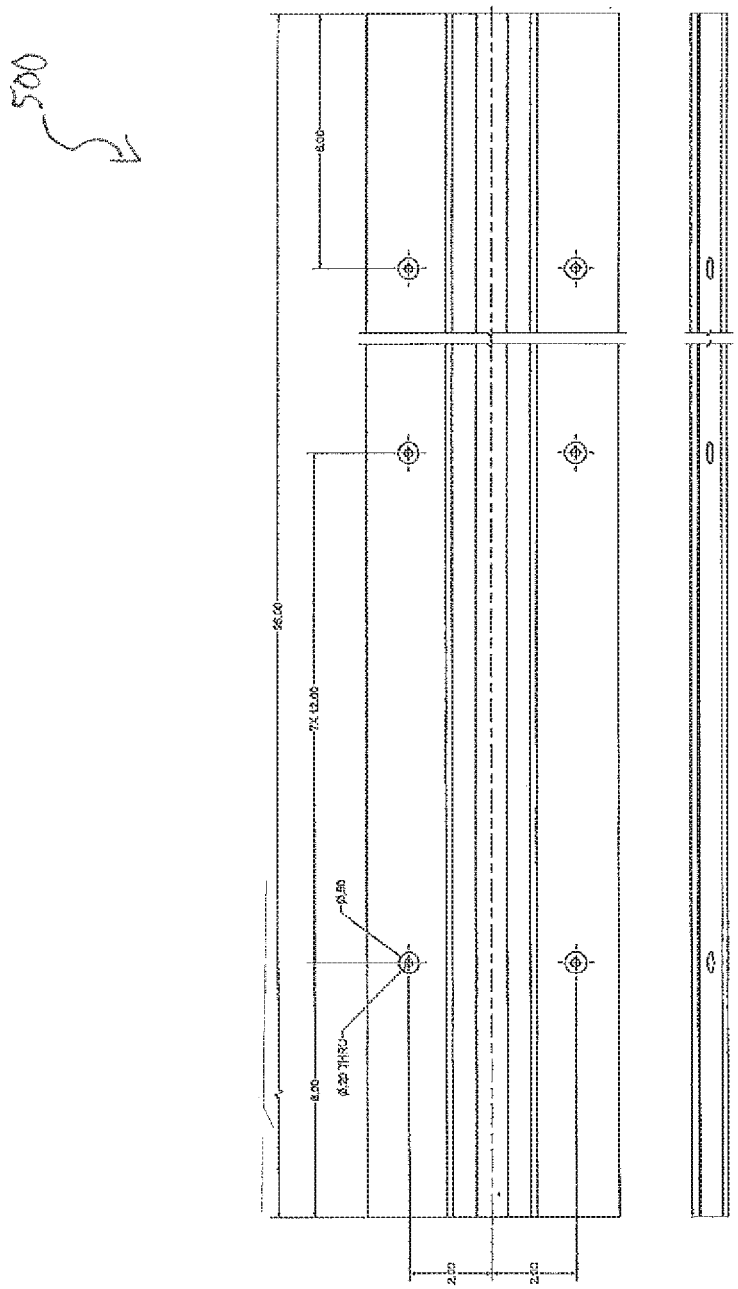
FIG. 5 is a top view of a straight track in accordance with the pinniped deterrent system.

FIG. 5 is a schematic diagram of a straight track 500.

Figures 6A, 6B:
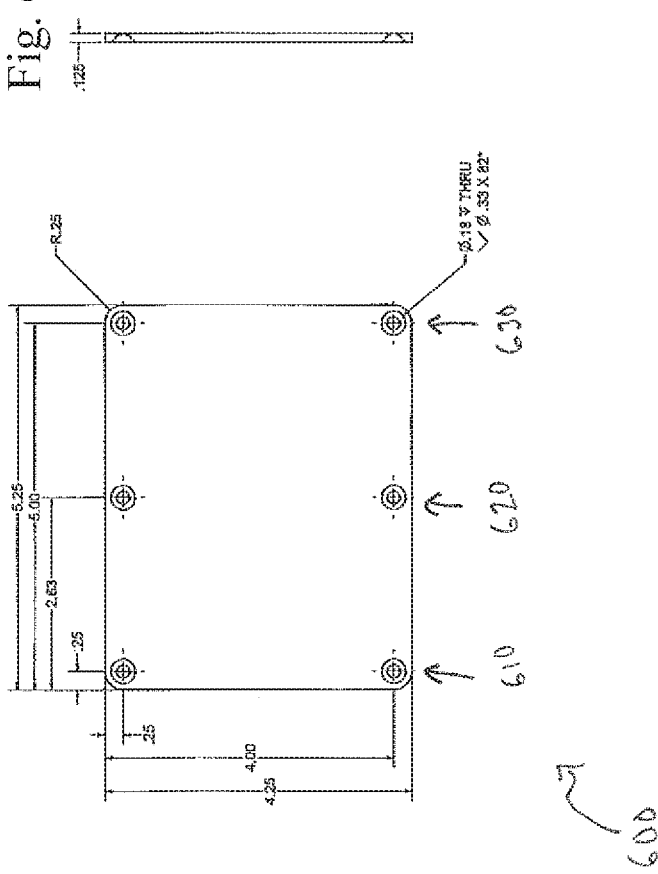
FIG. 6A is a top view of a cover for the expansion joint in accordance with the pinniped deterrent system.
FIG. 6B is a cross section of a cover for the expansion joint in accordance with the pinniped deterrent system.

FIG. 6A is an embodiment of a lid 600 that can fit on top of an expansion joint, such as expansion joint 200 as seen in FIG. 2. Coupling mechanisms 610, 620, and 630 are examples of locations where lid 600 can be nailed or screwed or similarly fastened into place on top of an expansion joint. FIG. 6B is a cross section of lid 600.

FIG. 7 shows various embodiments of tab 700 that can be mounted on top of the deterrent system 100 to secure conductive wires in place. FIG. 7A is a schematic diagram of a tab 700. FIG. 7B is one embodiment of an actual tab 700 that can be placed on top of system 100 covering electrically insulated channels 126, 128, 154, 156, 194, and 196, preventing the conductive wires from sliding out or becoming displaced. Alternatively, holes 710 and 720 can be lined up with, for example, holes 405 and 415 on corner track 400 and then secured to a pier or similar structure. FIGS. 7C-7D are schematic diagrams showing a cross-section of FIG. 7A.

FIGS. 8A-8C show schematic diagrams of various embodiments of a connector key that fits into the recessed channels in system 100. In FIG. 8A, connector key 810 has a 45-degree angle, and would slide into recessed channel 162 of expansion joint 140 and recessed channel 189 of corner track 180 having a 45-degree angle, connected expansion joint 140 and corner track 180 together. Similarly, if corner track 180 had a 90-degree angle, then connector key 820 having a 90-degree angle could connect corner track 180 and expansion joint 140. Connector key 830, having no angle, would connect expansion joint 140 and straight track 110 at recessed channels 162 and 124, respectively. Even though system 100 can be secured to a pier or similar structure using nails, screws, or a similar fastener mechanism, connector keys 810, 820, and 830 will help to reinforce the strength of system 100.

FIGS. 9A-9F show various schematic diagrams of expansion joint with lid 900. FIG. 9A is a top view of expansion joint with lid 900. FIGS. 9B-9F are cross-section embodiments of expansion joint with lid 900.

FIG. 10 shows embodiments of a pinniped deterrent system 1000 mounted onto a pier 1100. FIG. 10A is a close-up of system 1000 mounted onto pier 1100 where the pier 1100 is expanded. FIG. 10B is an expanded view of FIG. 10A. FIG. 10C is a close-up of a corner track 1200 and a straight track 1300 that make up part of system 1000, mounted onto pier 1100.

Figure 11A:
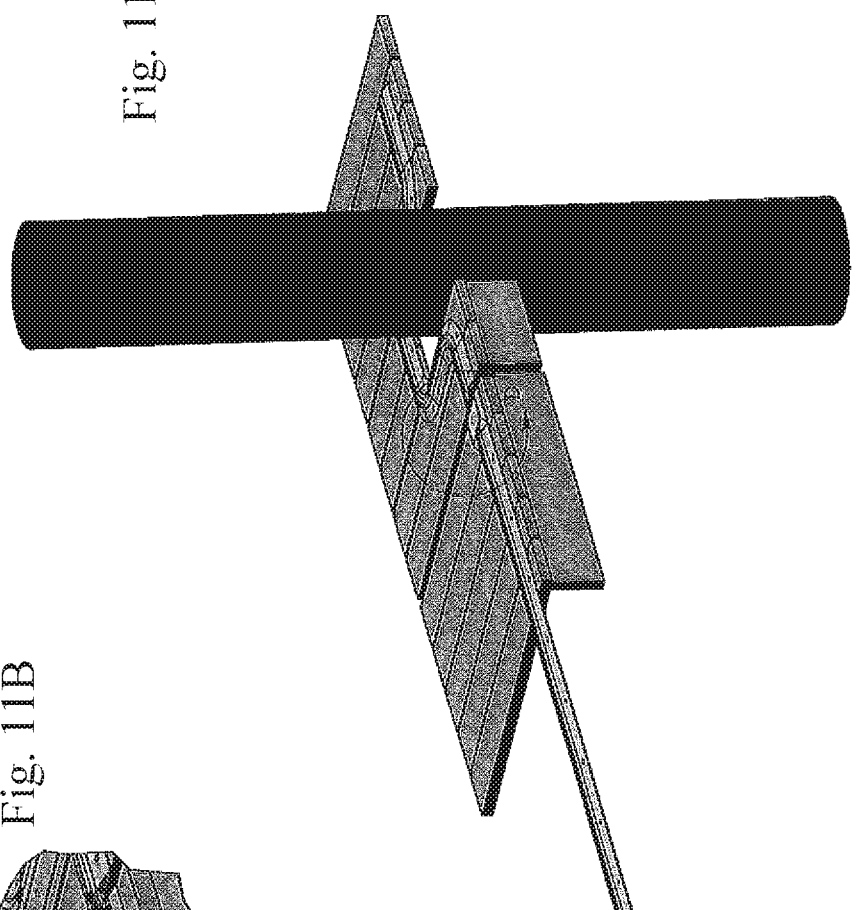
FIG. 11A shows a side view of a pinniped deterrent system mounted to a pier.
Figure 11B:
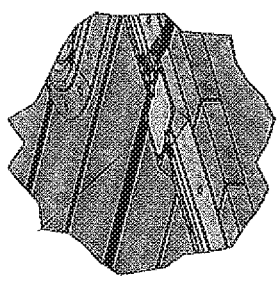
FIG. 11B shows a close-up side view of an expansion joint connected to a straight track mounted to a pier in accordance with the pinniped deterrent system.

FIGS. 11A and 11B show a side view of FIGS. 10B and 10A, respectively FIG. 12 shows an embodiment of the pinniped deterrent system as connected to a power source.

The invention claimed is:

1. A system for deterring pinnipeds, comprising:
    a straight track having a top surface, a bottom surface, a first end, and a second end, the top surface having two electrically-insulated parallel channels running from the first end to the second end,
    an expansion joint, connected to the straight track, having a top surface, a bottom surface, a first end, and a second end, the top surface having two parallel wells and two electrically-insulated parallel channels running from the first end to the second end through the wells and aligning with the two electrically-insulated parallel channels of the straight track,
    wherein a conductive wire runs through each electrically-insulated parallel channel of each respective two electrically-insulated parallel channels of the straight track and the expansion joint,
    wherein excess which conductive wire is housed in the wells, the excess conductive wire having a spring shape for facilitating expansion, and
    wherein the conductive wire is connected to a power source.

2. The system of claim 1,
    wherein the expansion joint and the straight track have a recessed channel running through the center of bottom surface from the first end to the second end, and
    wherein a connector key slides into the recessed channel and connects the expansion joint and the straight track together at one of the first end and the second end.

3. The system of claim 2, further comprising a corner track having a top surface, a bottom surface, a first end, and a second end, the top surface having two electrically-insulated parallel channels running from the first end to the second end that align with the two electrically-insulated parallel channels of the expansion joint and the straight track, the corner track having a curved shape from the first end to the second end, the bottom surface having a recessed channel running through the center from the first end to the second end, wherein a connector key slides into the recessed channel and connects to one of the expansion joint and the straight track at the first end or the second end.

4. The system of claim 3, further comprising a tab disposed over the two electrically-insulated channels and fastened with the straight track, the expansion joint, and the corner track holding the conductive wire within the channel.

5. The system of claim 4,
    wherein each of the expansion joint, the straight track, and the corner track comprises a first side and a second side, and
    wherein each of the expansion joint, the straight track, and the corner track comprises an incline from the first side to the center thereof and from the second side to the center thereof.

6. The system of claim 5, wherein each of the expansion joint, the straight track, and the corner track comprises a third channel running along each respective top surface for facilitating a positioning of an LED light.

7. The system of claim 6, wherein at least one of the expansion joint, the straight track, and the corner track comprises a bright color for facilitating demarcation from a mountable structure.

8. The system of claim 7, further comprising a lid fastened with the expansion joint.

9. A system for deterring pinnipeds, comprising:
a plurality of tracks, each track of the plurality of tracks comprising a top surface, a bottom surface, a recessed channel, and an electrically-insulated recessed channel;
a plurality of expansion joints, each expansion joint of the plurality of expansion joints comprising a top surface, a bottom surface, a recessed channel, an electrically-insulated recessed channel, and two wells; and
a plurality of connector keys operatively coupling together the plurality of tracks and the plurality of expansion joints, each connector key of the plurality of connector keys disposable in relation to each recessed channel of each track and each expansion joint,
each electrically insulated recessed channel configured to accommodate a conductive wire, and
each expansion joint configured to accommodate excess wire for forming a spring and for facilitating expansion.

10. The system of claim 9, wherein the conductive wire is connected to a power source.

11. The system of claim 10, wherein at least one of the plurality of tracks and the plurality of expansion joints is configured to mount in relation to a pier.

12. The system of claim 11, wherein the plurality of tracks and the plurality of expansion joints are elevated in relation to the pier for facilitating water drainage and for preventing electrical shortage.

13. The system of claim 12, wherein each track and each expansion joint comprises a third channel on each top surface for facilitating positioning of an LED light.

14. A device, comprising an expansion joint having a base, the base having a top surface, a bottom surface, a first end, a second end, a first side, and a second side, the bottom surface having a recessed channel through a center from the first end to the second end, the top surface having an incline from the first side to the center and an incline from the second side to the center, the top surface having two wells, and the top surface having two parallel grooved, a plurality of electrically-insulated channels running from the first end to the second end through the wells, wherein excess conductive wire is housed in the wells, the excess conductive wire having a spring shape for facilitating expansion.

15. The device of claim 14, wherein the expansion joint is connected to a track having a bottom surface, a top surface, a first end, a second end, a first side, and a second side, the bottom surface having a recessed channel through the center from the first end to the second end, the top surface having an incline from the first side to the center and an incline from the second side to the center, the top surface having two parallel grooved, electrically-insulated channels running from the first end to the second end and aligning with the plurality of electrically-insulated channels of the expansion joint.

16. The device of claim 15, further comprising a connector key configured to slide into, and couple together, the recessed channel of the expansion joint and the recessed channel of the track.

17. The device of claim 16, wherein each electrically-insulated channel of the plurality of electrically-insulated channels of the expansion joint and each electrically-insulated channel of the plurality of electrically-insulated channels of the track is configured to accommodate a conductive wire, the conductive wire attached to a power source.

18. The device of claim 17, wherein at least one of the expansion joint and the track is configured to mount in relation to a pier.

19. The device of claim 18, wherein at least one of the expansion joint and the track comprises a bright color for facilitating demarcation from the pier.

20. The device of claim 19, wherein at least one of the expansion joint and the track comprises a third channel running in relation to the top surface for facilitating integration of an LED light.

* * * * *